United States Patent
Johnson

(10) Patent No.: US 7,311,353 B1
(45) Date of Patent: Dec. 25, 2007

(54) INFANT SEAT ASSEMBLY

(76) Inventor: Dwight L. Johnson, 4420 Hopkinsville Rd., Cuerro, TX (US) 77954

( * ) Notice: Subject to any disclaimer, the term of this patent is extended or adjusted under 35 U.S.C. 154(b) by 0 days.

(21) Appl. No.: 11/403,424

(22) Filed: Apr. 12, 2006

Related U.S. Application Data

(60) Provisional application No. 60/671,672, filed on Apr. 15, 2005.

(51) Int. Cl.
*A47C 13/00* (2006.01)
(52) U.S. Cl. .................. 297/130; 297/256.16; 280/30; 280/47.38
(58) Field of Classification Search ............... 297/130, 297/129; 280/650, 30, 47.38, 643
See application file for complete search history.

(56) References Cited

U.S. PATENT DOCUMENTS

| | | |
|---|---|---|
| 4,620,711 A | 11/1986 | Dick |
| 4,874,182 A * | 10/1989 | Clark ................. 297/130 X |
| 5,104,134 A | 4/1992 | Cone |
| 6,237,995 B1 * | 5/2001 | Dierickx ................. 297/130 |

FOREIGN PATENT DOCUMENTS

EP 0466429 1/1992

* cited by examiner

*Primary Examiner*—Anthony D. Barfield
(74) *Attorney, Agent, or Firm*—Kenneth L Tolar

(57) ABSTRACT

An infant seat assembly includes a base member adapted to releasably support an accompanying infant seat member. The base member includes retractable wheels allowing the assembly to be used as a stroller. The infant seat member can be separated from the base member and used as an infant carrier. The infant seat member also includes wheels and an extendable handle allowing it to be used as a pull-style vehicle.

17 Claims, 2 Drawing Sheets

INFANT SEAT ASSEMBLY

CROSS REFERENCE TO RELATED APPLICATIONS

This application is entitled to the benefit of provisional application No. 60/671,672 filed on Apr. 15, 2005, the specification of which is incorporated herein by reference.

BACKGROUND OF THE INVENTION

The present invention relates to a uniquely designed infant seat assembly that can be interchangeably converted to a carrier, a stroller, a car seat or a pull-style vehicle.

DESCRIPTION OF THE PRIOR ART

When transporting an infant in a vehicle, a parent or guardian must place the infant within a child seat and strap the seat within the vehicle passenger compartment. Often, the parent or guardian also needs a stroller or carrier to facilitate walking with the child once arriving at a destination. In such event, the parent or guardian must also pack a stroller or carrier which occupies a significant amount of storage space.

A review of the prior art indicates at least one combination car seat and stroller. For example, U.S. Pat. No. 5,104,134 issued to Cone discloses such a combination. However, the device is unitary and therefore includes no means for detaching various components to convert it to an infant carrier or pull-style carrier. Accordingly, there is currently a need for a device that combines the features and advantages of a stroller, a car seat, a pull-style vehicle and an infant carrier. The present invention addresses this need by providing a uniquely designed child seat that can be quickly and easily converted to either a carrier, a car seat, a stroller or a pull-style vehicle.

SUMMARY OF THE INVENTION

The present invention relates to an infant seat assembly. The device comprises a base member adapted to releasably secure and support an accompanying infant seat member. The base member includes retractable wheels allowing the assembly to be converted to a stroller. The infant seat member can be separated from the base member and used as a carrier. The infant seat also includes wheels and an extendable handle allowing the infant carrier to be used as a pull-style vehicle, when separated.

It is therefore an object of the present invention to provide an infant seat assembly that can be quickly and conveniently converted to a carrier, a stroller, a car seat or a pull-style vehicle.

It is another object of the present invention to provide an infant seat that eliminates the burdensome task of transporting and storing multiple infant vehicles.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
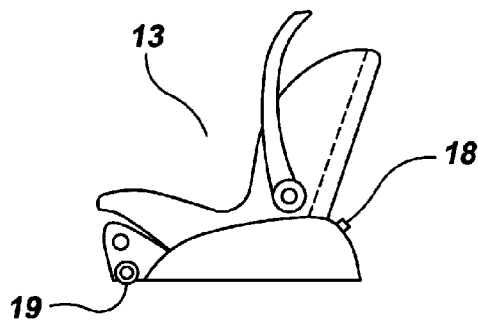
FIG. 1 depicts the device as an infant carrier.
Figure 2:
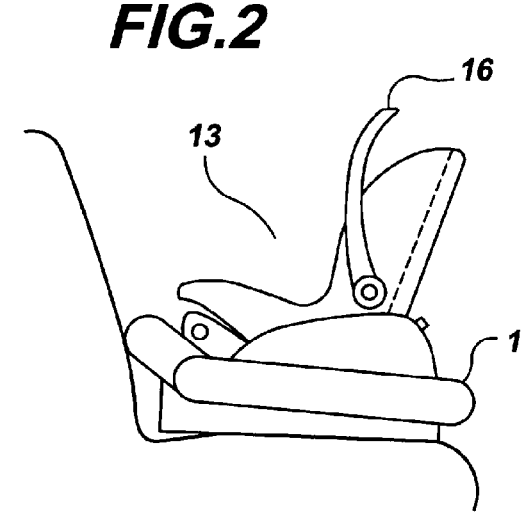
FIG. 2 depicts the device as a car seat.
Figure 3:
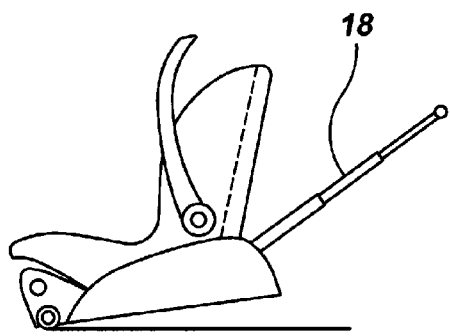
FIG. 3 depicts the device as a pull-style carrier.
Figure 4:
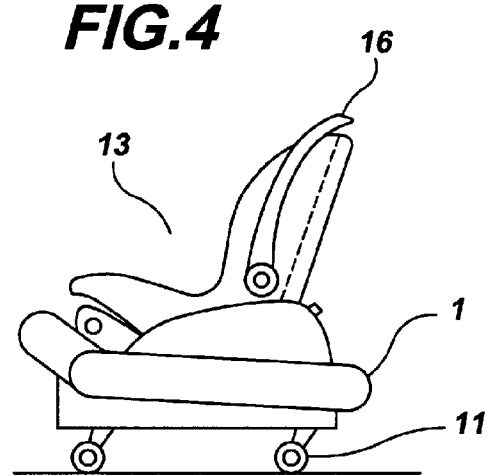
FIG. 4 depicts the device as a stroller.
Figure 5:
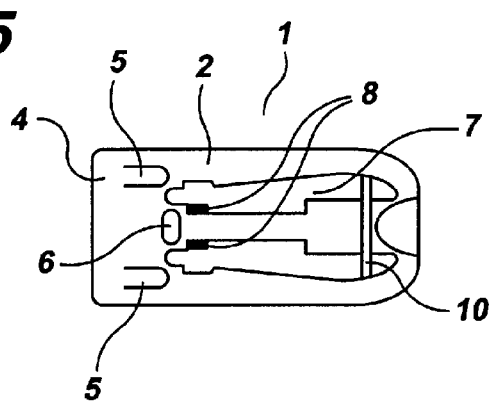
FIG. 5 is a top view of the base member according to the present invention.
Figure 6:
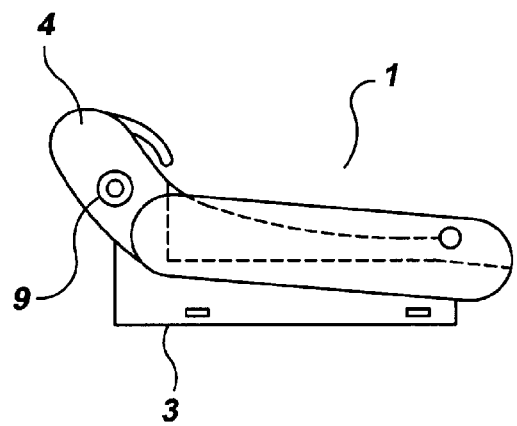
FIG. 6 is a side view of the base member according to the present invention.

Now referring to FIGS. 1-5, the present invention relates to an infant seat assembly. The device comprises a base member 1 having an upper surface 2, a lower surface, a pair of opposing sides 3 and an upturned rear portion 4. On the upturned rear portion are a pair of retaining flanges 5 for slidably receiving a vehicle seat belt to secure the base member within the passenger compartment. A rotating block 6 is disposed between the flanges which is rotated to a position perpendicular to the seat belt to further secure it to the base member.

Formed on the upper surface of the base member is a cavity 7 that is configured, contoured and dimensioned to receive an accompanying infant seat member, described in more detail, infra. Within the cavity are a pair of spring-biased latches 8 that may be selectively retracted with a release button 9 on a side of the upturned portion. The latches grip the infant seat member when placed within the cavity. The cavity also includes a transverse bar 10 that seats within a pair of hooks integrally molded within a lower end of the infant seat member.

Figure 9:
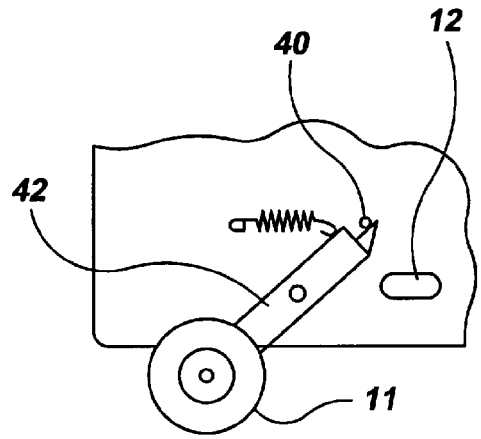
FIG. 9 depicts the wheel assembly of FIG. 8 in a deployed configuration.

Positioned beneath the lower surface of the base member are a plurality of retractable wheels 11 which may be selectively deployed to allow the base member to roll along an underlying surface. The wheels are each mounted on an arm 42 that is spring-biased in a deployed position as depicted in FIG. 9. However, each wheel may be pivoted into the base member interior against the bias of the spring until anchored by a releasable catch 12. By pressing downwardly on the base member, a user can simultaneously retract all of the wheels. Each catch includes an indention such that depressing the catch will release the arms and thus the wheels for deployment. A stop member 40 limits the forward movement of each arm when deployed. The wheels positioned adjacent one end of the base member swivel allowing the base member to be steered when the device is being used as a stroller.

Figure 7:
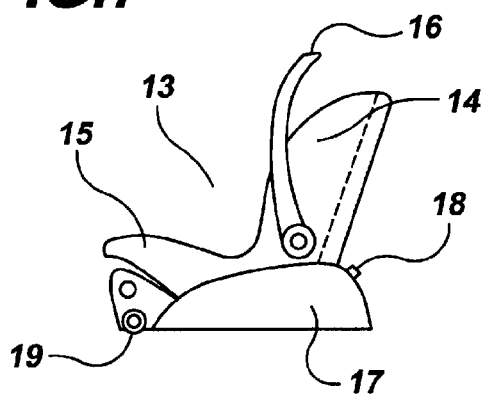
FIG. 7 is a side view of the infant seat member according to the present invention.
Figure 8:
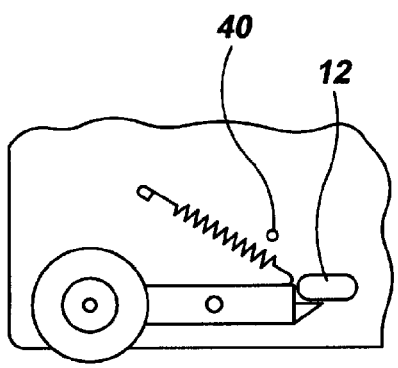
FIG. 8 is a detailed view of the retractable wheel assembly with the wheels in a retracted position.

Now referring to FIG. 7, the infant seat member includes a chair 13 having a backrest section 14 and a seat section 15. The chair includes a conventional multi-point child harness assembly to safely restrain a child. A pivotal handle 16 is secured to each of two opposing sides of the backrest section allowing the infant seat member to function as a conventional child carrier. The infant seat member is mounted on a support structure 17 that is dimensioned and configured to tightly fit within the cavity on the base member. On a rear end of the support structure is a telescoping U-shaped handle 18 that can be extended and retracted. One or more fixed wheels 19 are positioned on a front end of the support structure.

Accordingly, to use the device as a conventional infant seat, a parent or guardian secures the base member to a vehicle passenger seat by fastening the vehicle seat belt beneath the belt flanges. The infant seat member is then secured within the infant seat receiving cavity and a child is strapped within the infant seat in a conventional fashion. The device is converted to a stroller by removing the entire assembly from the vehicle and deploying the base member wheels allowing the entire assembly to be easily rolled along an underlying surface. The pivoting infant seat handle is used to maneuver the assembly. To convert the device to an infant carrier, a user merely separates the infant seat member from the base member by depressing the release button. The carrier can be used as a pull-style vehicle by extending the U-shaped handle and positioning the fixed wheels on the ground. The user then grasps the handle and pulls the carrier as desired.

The above described device is not limited to the exact details of construction and enumeration of parts provided herein. Furthermore, the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The invention claimed is:

1. An infant seat assembly comprising:
    a base member having an upper surface, a lower surface, a pair of opposing sides and a rear portion;
    a retractable wheel assembly on the lower surface of said base member;
    a cavity formed on the upper surface of the base member;
    an infant seat member detachably positioned within said cavity, said infant seat member including a chair having a backrest section and a seat section whereby said wheel assembly is deployed to allow said infant seat assembly to be used as a stroller and a car seat, while said infant seat member is detached from said base member allowing said infant seat member to be used as an infant carrier
    a pair of retaining flanges on the rear portion of said base member for slidably receiving a vehicle seatbelt to secure the base member within a passenger compartment;
    a rotating block disposed between said flanges which is rotated to a position perpendicular to the seatbelt to further secure said seatbelt to the base member.

2. The infant seat assembly according to claim 1 further comprising a pair of spring-biased latches positioned within said cavity that grip the infant seat member when said seat member is placed therein, said latches selectively retractable with a release button positioned on said base member.

3. The infant seat assembly according to claim 1 further comprising a transverse bar received within said cavity that grips a pair of hooks integrally molded within a lower end of the infant seat member.

4. The infant seat assembly according to claim 1 wherein a wheel of said wheel assembly is mounted on an arm, said arm spring-biased in a deployed position, said arm pivotal into an interior;
    a releasable catch positioned on said base member for selectively anchoring said arm and said wheel in a retracted position.

5. The infant seat assembly according to claim 4 further comprising a stop member that limits forward movement of each arm when deployed.

6. The infant seat assembly according to claim 1 wherein said infant seat member includes a pivotal handle secured to each of two opposing sides of the backrest section allowing the infant seat member to function as a conventional child carrier.

7. The infant seat assembly according to claim 1 wherein said infant seat member is mounted on a support structure that is dimensioned and configured to tightly fit within the cavity on the base member.

8. The infant seat assembly according to claim 7 further comprising a telescoping U-shaped handle on a rear end of the support structure that is extendable and retractable.

9. The infant seat assembly according to claim 8 further comprising at least one wheel on a front end of the support structure allowing said infant seat member to function as a pull-style carrier.

10. An infant seat assembly comprising:
    a base member having an upper surface, a lower surface, a pair of opposing sides and a rear portion;
    a retractable wheel assembly on the lower surface of said base member;
    a cavity formed on the upper surface of the base member;
    an infant seat member detachably positioned within said cavity, said infant seat member including a chair having a backrest section and a seat section, said infant seat member mounted on a support structure that is dimensioned and configured to tightly fit within the cavity on the base member;
    a telescoping U-shaped handle on a rear end of the support structure that is extendable and retractable;
    at least one wheel on a front end of the support structure allowing said infant seat member to function as a pull-style carrier whereby said wheel assembly is deployed to allow said infant seat assembly to be used as a stroller and a car seat, while said infant seat member is detached from said base member to allow said infant seat member to be used as an infant carrier.

11. The infant seat assembly according to claim 10 further comprising a pair of spring-biased latches positioned within said cavity that grip the infant seat member when said infant seat member is placed therein, said latches selectively retractable with a release button positioned on said base member.

12. The infant seat assembly according to claim 10 further comprising a pair of retaining flanges on the rear portion of said base member for slidably receiving a vehicle seatbelt to secure the base member within a passenger compartment.

13. The infant seat assembly according to claim 12 further comprising a rotating block disposed between said flanges which is rotated to a position perpendicular to the seatbelt to further secure said seatbelt to the base member.

14. The infant seat assembly according to claim 10 further comprising a transverse bar received within said cavil that grips a pair of hooks integrally molded within a lower end of the infant seat member.

15. The infant seat assembly according to claim 10 wherein a wheel of said wheel assembly is mounted on an arm, said arm spring-biased in a deployed position, said arm pivotal into an interior;
    a releasable catch positioned on said base member for selectively anchoring said arm and said wheel in a retracted position.

16. The infant seat assembly according to claim 15 further comprising a stop member that limits forward movement of said arm when deployed.

17. The infant seat assembly according to claim 10 wherein said infant seat member includes a pivotal handle secured to each of two opposing sides of the backrest section allowing the infant seat member to function as a conventional child carrier.

* * * * *